Patented Aug. 15, 1950

2,518,670

UNITED STATES PATENT OFFICE 2,518,670

VULCANIZATION OF ELASTOPRENES USING AS AN ACCELERATOR AN AMINE SALT OF 2,6-DIMERCAPTO-BENZO (1,2,4,5) BISTHIAZOLE

Maurice L. Dolt, Plainfield, N. J., and Ralph E. Sayre, Stamford, Conn., assignors to American Cyanamid Company, New York, N. Y., a corporation of Maine No Drawing. Application June 4, 1946,
Serial No. 674,376

8 Claims. (Cl. 260—79.5)

This invention relates to a novel type of vulcanization accelerator; to rubber compositions containing the same, and to methods of vulcanization using these accelerators. More specifically, the invention relates to novel accelerators which constitute amine salts of 2,6-dimercaptobenzo(1,2,4,5)bisthiazole, which for the sake of the present invention may be represented by the following formula:

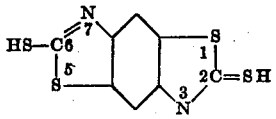

For many years elastoprenes such as natural rubber and, more recently, synthetic rubbers have been vulcanized using as the accelerator a 2-mercaptobenzothiazole, alone or in admixture with some complementary compound such as an accelerator, retarder, anti-oxidant and/or the like. Both the composition containing the single thiazole nucleus and also derivatives thereof have been used very widely.

By way of contrast, the 2,6-dimercapto-benzo-(1,2,4,5)bis thiazole, containing two thiazole nuclei, is not suitable for use and has not been used for these purposes although the compound itself has long been known. It is, therefore, both new and novel to find that certain amine salts of 2,6-dimercaptobenzo(1,2,4,5)bisthiazole not only are suitable for use as vulcanization accelerators but are approximately twice as active as the 2-mercaptobenzothiazole.

The amine salts of 2,6-dimercapto-benzo-(1,2,4,5)bisthiazole useful according to the present invention are those derived from amines which may be represented by the formula

in which R and R₁ stand for aliphatic or aralkyl hydrocarbon radicals or are aliphatic hydrocarbon residues forming with the N of heterocyclic ring containing no double bonds. A number of amines of this type give useful salts. Among such amines may be listed, for example, dimethylamine, diethylamine, di-n-butylamine, methylethylamine, ethylbenzylamine, diocto- decylamine, dicyclohexylamine, morpholine, thiomorpholine, piperidine, pyrrolidine, piperazine and the like.

These amine salts are readily prepared by crystallization from a suitable solvent for both the amine and the bisthiazole. In many cases water is suitable. In other cases organic solvents may be preferable. Some salts, such as that from piperidine, are only moderately soluble in cold water and crystallize readily on the cooling of a heated solution. The preparation of others which are more soluble ordinarily requires evaporation. Preparation of these amine salts may be illustrated by the following examples which are intended to be illustrative only and not by way of limitation. All parts are by weight unless otherwise noted.

Example 1

10.5 parts of 2,6-dimercapto-benzo(1,2,4,5)bisthiazole are dissolved in a hot solution of 20 parts of piperidine in 250 parts of water. Solution of the bisthiazole is readily obtained. On cooling a di-hydrate of the bispiperidine salt separates on cooling, the yield being excellent. The mother liquor contains the excess of piperidine which may be either recovered or added to in forming the solvent of the next operation.

Example 2

25.6 parts of dimercapto-benzo-bisthiazole are dissolved in a solution of 28 parts diethylamine and 1200 parts of water at the boil. On cooling part of the bis-diethylamine salt crystallizes. The remainder may be isolated by concentrating the solution; the excess diethylamine is recovered during this operation.

While the amine salts of the present invention are excellent accelerators, many of them, as pointed out above, being much more powerful than 2-mercaptobenzothiazole, they are not of the class which has come into use under the designation of "ultra" accelerators. This is of definite advantage in that it assists in insuring freedom from scorching. The accelerators of this invention produce excellent results when used in preparing unvulcanized natural rubber compositions and vulcanizing thereof. This may be illustrated for example by the following:

Example 3

The product of Example 1 (test series B) was tested as accelerator in the cure of smoked sheets and compared with 2-mercapto-benzothiazole (test series A). The following compounds were used:

|  | A | B |
|---|---|---|
| Smoked Sheets | 100 | 100 |
| Zinc Oxide | 6 | 6 |
| Sulfur | 3 | 3 |
| Stearic Acid | 1 | 1 |
| 2-mercapto-benzothiazole | 1 | ----- |
| Piperidine salt of Ex. 1 | ----- | .5 |

The tendency to scorching of the uncured compositions was investigated by the aid of the Williams plastometer (3 minutes—100° C.)

| | Y (thickness of sample after compression) | |
|---|---|---|
| | A | B |
| Before heating_____inches__ | .082 | .076 |
| After 2 hr. heating in water of 85° C__do____ | .109 | .089 |
| Change in per cent_____ | +33 | +17 |

Thus the scorching tendency of B is less than that of A. Specimen samples were then cured at 141° C. and Shore hardnesses were determined, the results obtained being shown below:

| Cure | Shore Hardness | |
|---|---|---|
| | A | B |
| 10 minutes | 40 | 39 |
| 15 minutes | 42 | 40 |
| 30 minutes | 47 | 46 |
| 45 minutes | 48 | 47 |
| 60 minutes | 49 | 48 |

Tensile strength tests were then carried out with the results shown in the following table in which the stress is at 500°; tensile strength is expressed in pounds per square inch; and the elongation is expressed in percent:

| Cure | Sample A | | | Sample B | | |
|---|---|---|---|---|---|---|
| | Stress at 500° | Tensile Strength | Elongation | Stress at 500° | Tensile Strength | Elongation |
| 30 minutes | 445 | 2,780 | 795 | 415 | 2,660 | 785 |
| 45 minutes | 450 | 3,045 | 825 | 440 | 3,535 | 830 |
| 60 minutes | 450 | 3,070 | 875 | 500 | 2,815 | 770 |

It will be noted that B is almost twice as effective as A, as it produces similar results when used in only half the amount of A.

As has been pointed out, the products of the present invention are also excellent accelerators for use with synthetic elastoprenes, i. e., compounds which are polymers of diolefines with conjugated double bonds or copolymers of such diolefines with a substance polymerizable therewith containing only a single olefinic linkage. Among such materials are the butadiene-styrene copolymers and the butadiene-acrylonitrile copolymers; polymerized isoprene; polymerized chloroprene and the like. The use in these compositions may be illustrated for example by the following in which it is used in comparison with a standard accelerator.

Example 4

The product of Example 2 (test series D) was tested as accelerator in the cure of a copolymer of approximately 75% butadiene and 25% styrene and compared with bis(2-benzothiazyl) disulfide (test series C). The following compounds were used:

|  | C | D |
|---|---|---|
| Butadiene-styrene copolymers | 100 | 100 |
| Refined coal tar oil softener | 5 | 5 |
| Zinc Oxide | 5 | 5 |
| Sulfur | 3 | 3 |
| Carbon Black | 50 | 50 |
| Bis(2-benzo-thiazyl) disulfide | 1 | ---- |
| Diethylamine salt of Example 2 | ---- | 1 |

The samples were cured at 140° C. and Shore hardnesses were determined as follows:

| Cure | Shore Hardness | |
|---|---|---|
| | C | D |
| 30 minutes | 54 | 49 |
| 60 minutes | 62 | 62 |
| 90 minutes | 65 | 67 |

As used in the following claims, the term "elastoprene" is intended to include the materials noted above which constitute members of the group consisting of natural rubber, and the sulfur-vulcanizable polymers of conjugated diolefins, and vulcanizable copolymers of a conjugated diolefin and a material copolymerizable therewith containing a single olefinic group.

We claim:

1. A vulcanizable composition, comprising sulfur, a sulfur vulcanizable elastoprene selected from the group consisting of natural rubber and the sulfur vulcanizable rubber-like polymers of diolefines containing conjugated double bonds and copolymers of such diolefines with a substance polymerizable therewith containing only a single olefinic linkage, and an effective activating amount of a vulcanization accelerator comprising a salt of 2,6-dimercapto-benzo-(1,2,4,5)bisthiazole and a secondary amine having the formula

in which formula R and $R_1$ represent radicals selected from the group consisting of the aliphatic hydrocarbon radicals, aralkyl hydrocarbon radicals, and radicals in which the N, R, and $R_1$ form a saturated heterocyclic ring selected from the group consisting of the 5- and 6-membered saturated heterocyclic ring.

2. As a novel vulcanizable composition, a mixture comprising a sulfur vulcanizable elastoprene selected from the group consisting of natural rubber and the sulfur vulcanizable rubber-like polymers of diolefines containing conjugated double bonds and copolymers of such diolefines with a substance polymerizable therewith containing only a single olefinic linkage, sulfur and an effective activating amount of a vulcanization accelerator comprising a piperidene salt of 2,6-dimercapto-benzo(1,2,4,5)bisthiazole.

3. As a novel vulcanizable composition, a mixture comprising a sulfur vulcanizable elastoprene selected from the group consisting of natural rubber and the sulfur vulcanizable rubber-like polymers of diolefines containing conjugated double bonds and copolymers of such diolefines with a substance polymerizable therewith containing only a single olefinic linkage, sulfur and an effective activating amount of a vulcanization accelerator comprising a diethylamine salt of 2,6-dimercapto-benzo(1,2,4,5) bisthiazole.

4. As a novel vulcanizable composition, a mixture comprising a sulfur vulcanizable elastoprene selected from the group consisting of natural rubber and the sulfur vulcanizable rubber-like polymers of diolefines containing conjugated double bonds and copolymers of such diolefines with a substance polymerizable therewith containing only a single olefinic linkage, sulfur and an effective activating amount of a vulcanization accelerator comprising a dicyclohexylamine salt of 2,6-dimercapto-benzo(1,2,4,5) bisthiazole and dicyclohexylamine.

5. A process of vulcanizing which comprises forming a mixture comprising a sulfur vulcanizable elastoprene selected from the group consisting of natural rubber and the sulfur vulcanizable rubber-like polymers of diolefines containing conjugated double bonds and copolymers of such diolefines with a substance polymerizable therewith containing only a single olefinic linkage, sulfur and an effective activating amount of a vulcanization accelerator comprising a salt of 2,6-dimercapto-benzo(1,2,4,5) bisthiazole and a secondary amine having the formula

in which formula $R$ and $R_1$ represent radicals selected from the group consisting of the aliphatic hydrocarbon radicals, aralkyl hydrocarbon radicals, and radicals in which the N, R, and $R_1$ form a saturated heterocyclic ring selected from the group consisting of the 5- and 6- membered saturated heterocyclic ring; subjecting the mixture to moderately elevated temperatures and continuing to maintain the mixture at the elevated temperature for sufficient time to accomplish the cure.

6. A process according to claim 5 in which the accelerator is a piperidine salt of 2,6-dimercapto-benzo(1,2,4,5) bisthiazole.

7. A process according to claim 5 in which the accelerator is a diethylamine salt of 2,6-dimercapto-benzo(1,2,4,5) bisthiazole.

8. A process according to claim 5 in which the accelerator is a dicyclohexylamine salt of 2,6-dimercapto-benzo(1,2,4,5) bisthiazole.

MAURICE L. DOLT.
RALPH E. SAYRE.

REFERENCES CITED

The following references are of record in the file of this patent:

UNITED STATES PATENTS

| Number | Name | Date |
|---|---|---|
| 2,024,605 | Sebrell | Dec. 17, 1935 |
| 2,184,238 | Lichty | Dec. 19, 1939 |
| 2,365,035 | Youker | Dec. 12, 1944 |
| 2,409,809 | Sperberg | Oct. 22, 1946 |